United States Patent
Gleichenhagen et al.

[11] Patent Number: 5,489,642
[45] Date of Patent: Feb. 6, 1996

[54] REPULPABLE CONTACT ADHESIVE

[75] Inventors: Peter Gleichenhagen; Andreas Westphal, both of Hamburg, Germany

[73] Assignee: Beiersdorf Aktiengesellschaft, Hamburg, Germany

[21] Appl. No.: 333,104

[22] Filed: Nov. 1, 1994

[30] Foreign Application Priority Data

Nov. 26, 1993 [DE] Germany .............. 43 40 297.6

[51] Int. Cl.[6] ........................................ C08L 51/06
[52] U.S. Cl. .................... 524/504; 524/547; 524/236; 524/366; 428/40
[58] Field of Search .................... 524/504, 547, 524/236, 366; 428/40; 525/283, 291, 309, 296, 274, 301

[56] References Cited

U.S. PATENT DOCUMENTS

| | | |
|---|---|---|
| 2,838,421 | 6/1958 | Sohl . |
| 3,441,430 | 4/1969 | Petersen . |
| 3,661,874 | 5/1972 | Olson . |
| 4,413,082 | 11/1983 | Gleichenhagen .............. 524/243 |
| 4,443,576 | 4/1984 | Bhattacharyya et al. . |
| 5,326,644 | 7/1994 | Scholz .............. 428/514 |
| 5,380,779 | 1/1995 | D'Haese .............. 524/272 |

FOREIGN PATENT DOCUMENTS

| | | |
|---|---|---|
| 0081846 | 3/1986 | European Pat. Off. . |
| 0352442 | 11/1992 | European Pat. Off. . |
| 2360441 | 4/1975 | Germany . |
| 3105894 | 7/1982 | Germany . |
| 3423446 | 2/1986 | Germany . |

*Primary Examiner*—Vasu S. Jagannathan
*Attorney, Agent, or Firm*—Sprung Horn Kramer & Woods

[57] ABSTRACT

Repulpable contact adhesive based on a graft polymer in which 3–20% by weight of vinyl compounds having sulphonic acid salt groups are grafted onto a copolymer of (meth)acrylates and (meth)acrylic acid and which is rendered tacky by means of water-soluble plasticizers.

11 Claims, No Drawings

REPULPABLE CONTACT ADHESIVE

The invention relates to repulpable contact adhesives as well as tapes, labels or other articles adhering on contact, all treated therewith, and formulations. These are used primarily in the paper-producing and paper-processing industry as repulpable, recyclable products.

For procedures in papermaking, conversion and printing, it is frequently necessary to splice paper webs if it is intended to stick the web of a new paper bale to be drawn into the terminating web of a bale already processed, for example in coating lines or printing presses. The mechanical loads of these splices may differ very greatly. If the splicing process is carried out, for example, when changing during operation, the web speeds of up to 1500 m/min which are usual today and the low bonding pressure (for example, air brush) necessitate the use of a highly tacky soft contact adhesive film. If, on the other hand, adhesive bonds are to remain dimensionally stable over a relatively long period under high winding tension and pressure in the paper bale, a hard shear-resistant contact adhesive film which does not release components which penetrate into the paper is required. A splice thickness which is as small as possible is generally desired. This permits a trouble-free process sequence in the various processing operations (coating, calendering, etc.). The required adhesive properties must accordingly be fulfilled by contact adhesive films which are as thin as possible and preferably free of a support substrate. In addition to these extremes, there are intermediate stages depending on the intended use. Satisfactory recycling of the adhesively bonded papers free of specks and residual tack, must be guaranteed over long ageing times of the adhesive bond, even under occasional thermal stresses. Polyvalent cations, such as $Ca^{++}$, $Mg^{++}$ and $Al^{+++}$, which are present in the process water of the paper mills and the papers and may adversely affect the repulpability of the adhesive materials by means of crosslinks must not have an adverse effect on the recyclability of the adhesive bonds.

There have in the past been a number of developments which have aimed at fulfilling the requirements described above. This has been satisfactory only in part and there is therefore still a need for an improved overall solution.

The first disclosed contact adhesive of this type is described in U.S. Pat. No. 2,838,421 (Sohl). It consists of polyacrylic acid plasticized with polypropylene glycol to give a water-soluble contact adhesive. U.S. Pat. No. 3,441,430 (Peterson) describes a repulpable self-adhesive tape whose contact adhesive material consists of an acrylic acid/ethyl acrylate copolymer which is rendered tacky with water-soluble plasticizers having at least one ether function.

U.S. Pat. No. 3,661,874 (Olson) describes an epoxidized rubber which has been reacted with a secondary monoamine and is rendered tacky with a water-soluble plasticizer. German Offenlegungsschrift 2,360,441 (Blake) describes a copolymer of acrylates and vinylcarboxylic acids which is partly neutralized with liquid polyoxyethylene compounds and/or with the reaction product of an acidic rosin with an alkanolamine. The cohesion of the contact adhesive can be increased by using ethoxylated diamines which, together with ethoxylated monoamines as tackifying plasticizers, are particularly compatible with the acidic skeletal polymer, as described in German Patent 3,105,894 (Gleichenhagen et al.).

European Patent 0,141,504 (Blake) describes a repulpable contact adhesive material which can also be used on carbonless papers and is particularly penetration-resistant. It consists of a vinylcarboxylic acid/acrylate copolymer which is partly neutralized with NaOH and/or LiOH and is rendered tacky with ethoxylation products of phosphoric acid and diamines.

In order to improve the splice strength at relatively high temperatures, acrylamides are claimed, in addition to the abovementioned polymer building blocks, in German Offenlegungsschrift 3,901,690 and European Patent 0,081,846 (Eskay). The terpolymers of N-vinyl-lactams or N-vinylamides, acrylic acid and alkyl vinyl ethers, described in DE-C 34 23 446, serve the same purpose. The use of acryloyloxypropionic acid instead of acrylic acid, as described in European Patent 0,352,442 (Czech), pursues the same aim. PCT/US 92/06731 describes a terpolymer which consists of polar monomers, such as, for example, acids or hydroxyalkyl esters, and monomers which are less polar, such as acrylate-based alkyl esters and a polymerizable, water-soluble macromer carrying a vinyl group, preferably a polyethoxyoxazoline, poly-N-vinylpyrrolidone or polyalkylene oxide derivative, and is mixed with water-soluble plasticizers to give a contact adhesive material. It is repulpable within a wide pH range.

A frequent disadvantage of the products described is due to the abovementioned content of polyvalent cations in the pulp water, the crosslinking potential of which, together with the carboxyl groups in the repulpable contact adhesive, leads to speck formation (stickies) during recycling. This very serious problem occurs in particular when, in order to achieve sufficient cohesion in the contact adhesive, partial crosslinking via carboxyl groups in accordance with the patent literature is already present and/or was produced between the functional groups by ageing processes, so that this problem occurs to a greater extent in aged products.

It is the object of the invention to provide a remedy here, in particular to provide a repulpable contact adhesive material which has outstanding adhesive properties even in thin layers, ensures satisfactory repulpability even in hard waters and retains these properties over relatively long periods and under short-term thermal stresses, without losses of quality.

The object is achieved by providing a contact adhesive material as characterized in more detail in the Claims, and which preferably consists of the following components:

a) 100 parts by weight of a graft polymer which consists of a copolymer of
1) 15–95% by weight of acrylic acid and
2) 0–70% by weight of alkyl acrylates having straight-chain or only slightly branched alkyl radicals of 1–12 C atoms, preferably ethyl acrylate, n-butyl acrylate, 2-ethylhexyl acrylate or mixtures thereof, onto which
3) 3–20% by weight of (meth)acrylates whose alkyl radical carries a sulpho group which is intramolecularly neutralized (betaine structure) or is present as an alkali metal salt, it being possible for the two neutralization forms to be present individually or as a mixture, are grafted by means of a graft-linking initiator.

b) 80–280 parts by weight of a water-soluble plasticizer. Ethoxylated water-soluble alkylmonoamines whose H atoms at the amino group are substituted by ethoxy segments and whose melting ranges are substantially below 0° C. are preferred. In addition to these plasticizers, polyethylene glycols and polypropylene glycols which are liquid at room temperature may also be used.

The graft polymerization with the (meth)acrylate derivatives described under a)3 ensures, via the sulphonic acid salt structures bonded to the polymer chains as far as possible in random distribution, defect-free repulpability of the contact adhesives even in hard waters, which can even be achieved with unexpectedly low contents of these structures. Furthermore, sulphobetaine structures increase the cohesion of the contact adhesive material in a desirable manner without adversely affecting the repulpability.

By means of the grafting process, the undesired effects of the very different polymerization parameters and the very different solubility parameters between the monomer groups a)2 and a)3 are avoided. In a terpolymerization, this incompatibility of the monomers causes an inhomogeneous distribution of the monomer segments between the polymer chains, which may lead to phase separation between the polymers having polarities of different magnitudes. This results in contact adhesives which contain not only readily repulpable components but also less readily repulpable polymer chains. The latter may then act as nuclei and initiate the harmful sticky formation in the paper machines.

Among the abovementioned derivatives under a)3, the following compounds are preferably used:
1. 2-Propionic acid 3-sulphopropyl ester (3-sulphopropyl) acrylic ester potassium salt Abbreviation: SPA (CAS nomenclature)
2. 1-Propanaminium-N,N-dimethyl-N-[2-[(2-methyl-1-oxo-2-propenyl) -oxo]-ethyl]-3-sulpho, hydroxide inner salt Abbreviation: SPE (CAS nomenclature)

The monomers carrying sulpho groups are preferably used in the form of their salts, since only these have relatively long-term chemical stability and a long shelf life.

The initiators used for grafting give, on thermal decomposition, free radicals which, owing to their high reactivity, are capable of abstracting H atoms from the polymer chains with saturation and thus transfer the free radical function to the polymer chains. The chain radical then reacts by grafting with the monomer to be grafted, the graft growing according to the reactivity of the monomer and its concentration.

The suitability of the initiators for a high grafting yield is determined by the following method:

An exactly 0.1 molar solution of the initiator is decomposed in n-pentadecane under an He atmosphere. The reaction time is chosen so that it corresponds to ten times the half-life of the particular initiator at the chosen temperature. This ensures virtually complete decomposition of the initiator. The amount of dimeric pentadecane formed is then measured by means of GLC. The percentage is expressed as a measure of the grafting efficiency. Usually, the reaction temperature is chosen so that the half-life of the initiator to be tested is 15 min at this temperature. The method is based on publications by J. D. van Drumpt and H. H. J. Oosterwijk (Journal of Polymer Science, Polymer Chemistry Edition, Vol. 14, No. 6, June 1976, pp 1495–1511).

In the present procedure, grafting is preferably carried out using initiators which give high grafting yields at relatively low temperatures. Bis-(4-tertbutylcyclohexyl) peroxydicarbonate (trade name of Akzo Chemie: Perkadox 16), which has a grafting efficiency as high as 24 at 60° C., is therefore particularly preferred for the grafting reaction with the monomers of group a)3. A similar grafting efficiency of 28 is achieved with dibenzoyl peroxide at 92° C. Although a substantially higher grafting efficiency of 51 can be achieved with dicumyl peroxide, since this is not achieved until a temperature of 128° C. is reached its use is not preferred owing to a higher level of secondary reactions in this temperature range.

The initiators are preferably metered in as solutions in organic solvents, such as, for example, acetone, during the grafting reaction. The monomers of group a)3 which are to be grafted are metered as aqueous solutions into the completely polymerized solution of the copolymers of the monomers of group a)1 and a)2, the reaction temperature being adjusted to a range between 50° C. and 95° C. In order to avoid gel formation via free radical crosslinking reactions, the concentration of the initially introduced copolymer is set sufficiently low, preferably below 40%. In addition, the actually effective concentration of the graft initiator should be kept sufficiently low.

The copolymerization with the monomers of groups a)1 and a)2 is carried out by a free radical mechanism in organic solvents which are at least partially miscible with water, in a temperature range of in particular between 50° C. and 95° C., preferably 55° C.–70° C. Preferably used solvents are acetone and mixtures thereof with water and lower homologues of the alcohols, such as, for example, ethanol. For chain-length regulation, relatively small amounts of isopropanol or other known regulators may also be used.

Since these copolymers should be composed of substantially linear polymer chains, their synthesis is preferably carried out using initiators whose free radicals have a relatively low energy content and therefore never or rarely cause hydrogen abstraction at the polymer chains and whose grafting efficiency accordingly tends to 0. For example, azo initiators, such as azobis-isobutyronitrile or 2,2-azobis-(2-methylbutyronitrile), are therefore preferably used.

In addition to the monomers described under a)1 and a)2, other monomers copolymerizable with these may also be used in a minor amount for the preparation of the copolymer. Monomers which contain amido groups, such as, for example, (meth)acrylamide derivatives or N-vinyl-lactams, are preferably used for this purpose.

The K value of the polymers (according to H. Fikentscher) should be between 60 and 95.

This corresponds to a relative viscosity of 2.031–4.871 at 25° C.

After the polymer solution has been mixed with the plasticizers described under b), the amount of water in the solvent mixture should not substantially exceed 50% by weight. This applies in particular to direct coatings of the contact adhesive solution onto parting surfaces. Too large an amount of water leads to wetting errors.

The addition of crosslinking compounds is advisable, particularly for contact adhesive formulations having high shear strength. However, the crosslinking density should be adjusted to a very low degree so that the repulpability is retained. For example, a derivative of bisphenol A in which two glycidyl radicals are bonded to the bisphenol by etherification of the OH groups is suitable. Aluminium acetylacetonate is also suitable. The crosslinking substances can be used in particular in an order of magnitude of about 0.01% by weight-1.5% by weight, based on the polymer and the plasticizer content of the contact adhesives.

In order to increase the adhesive power, polar adhesive resins, individually or as a mixture, having acid numbers of in particular greater than 120 and sufficient solubility in polar solvents, may be mixed with the formulation. Their amount in the contact adhesive film may be in particular between 3 and 30% by weight. The contact adhesive solutions can be processed by the known methods of industry to give self-adhesive articles bonding on one side or both sides.

Test methods for such contact adhesive films are mentioned below and examples are described for further illustration of the invention.

Test methods

1. Testing of the repulpability

The test is carried out according to test method Tappi UM 213 A for the recyclability of water-dispersible self-adhesive tapes. The test paper used for the adhesive bonding is "James River Pulp Testing Paper white 417-01-50" from Curtis Paper Division. The water hardness is 300 mg CaO/1 liter $H_2O$, corresponding to 30 dH.

2. Static shear test

A contact adhesive layer is produced by painting a contact adhesive solution onto a release paper and drying the coat (25 min at 95° C.). The thickness of the dried film is between 45 μm and 55 μm. A bonding surface of 13×20 mm is cut from this film and is laminated between two gravure printing paper strips (Turbo-Press T54G Feldmühle AG) having a width of 20 mm and a length of about 100 mm. The long sides of the rectangular bonding surface are arranged in such a way that they are parallel to the long sides of the paper strips and 3.5 mm away from the strip edges. The splices produced by rolling (0.2 m/sec) a steel roller weighing 2 kg five times over the bonding area are conditioned for 48 h at 23° C. and 55% relative humidity (standard climate, DIN 50014-23/50-1). The splice is then subjected to a tensile force parallel to the bonding surface in the longitudinal direction of the paper strips. The parallel displacement distance in the splice as a function of time (contact adhesive films having high shear strength) at a tensile load of 10 N or the time required for complete shearing off (splice rupture) of the adhesive bond (flexible films having high tack) at a tensile force of 5 N is measured.

Adhesive power at a take-off angle of 180°

Steel sheets measuring 220×50 mm (about 2 mm thick) are firmly bonded on one side with a highly pick-resistant, very smooth, highly calendered label paper. A contact adhesive film is produced as described in the static shear test and is transferred from the release paper to a 55 g coated base paper. The coated base paper treated in this manner with a 45–55 μm thick contact adhesive film is cut into 20 mm wide strips having a length of about 300 mm. The strips are placed with the self-adhesive side in the longitudinal direction on the label paper surface and bonded to the label paper by rolling over ten times with a steel roller weighing 2 kg (0.2 m/sec). The test specimens are conditioned for 48 h at 23° C. and 55% relative humidity (standard environment). They are then clamped in a tensile tester and the take-off force required for removing the self-adhesive tape from the label paper at a take-off angle of 180° and a take-off speed of 300 mm/min, based on a bond width of 1 cm, is determined.

Measurement of the tack

A tape-like test specimen having a length of 950 mm and a width of 15 mm and produced correspondingly to the test specimens for the measurement of the adhesive power is fixed along the circumference (1 m) of a wheel (drive wheel) so that the adhesive coat points outwards. Label paper (test base) is stuck over the circumference (196 mm) of a test wheel, and said test wheel is placed on the drive wheel, at the upper vertex vertically above the axis of rotation, so that the axes of rotation of both wheels are exactly parallel and the adhesive coat to be tested and present on the drive wheel is completely covered over its width by the test base at the point of contact with the test wheel. The pressure applied by the test wheel to the adhesive coat is adjusted to 5 g by means of a counterweight. The drive wheel is then turned at a peripheral velocity of 16 cm/sec, and the tensile force exerted by the adhering adhesive material on the test wheel in contact with it is determined by means of a load cell applied to the axle of the test wheel. The measuring distance corresponds to the circumference of the test wheel. Values averaged over the measuring distance are stated.

Experimental section

EXAMPLE 1

1.1 Preparation of a hydrophilic skeletal polymer 315 g of acrylic acid, 112.5 g of 2-ethylhexyl acrylate, 250 g of acetone, 100 g of ethanol and 100 g of water are weighed into a vacuum-tight steel polymerization apparatus having a capacity of 2 l and possessing a reflux condenser, an anchor stirrer, a heating jacket and metering apparatuses. After evacuation, flushing with $N_2$ and heating up to 62° C., a solution of 0.6 g of 2,2-azobis-(2-methylbutyronitrile) in 6.4 g of acetone is added, while stirring, to the reaction medium boiling at 600 hPa. The polymerization starts with slowly decreasing boiling point and increasing viscosity. After a reaction time of 30 min, a further 0.5 g of 2,2-azobis(2-methylbutyronitrile), dissolved in a mixture of 75 g of acetone, 50 g of ethanol and 50 g of water, is added at 58° C. and the pressure is increased to 700 hPa. After a further 60 min and a further increase in viscosity, another 75 g of acetone, 50 g of ethanol and 50 g of water are added at 60° C. and the pressure is increased to 800 hPa. Further dilution is effected after 120 min at 63° C. and about 1,000 hPa (atmospheric pressure) with 75 g of acetone, 50 g of ethanol and 50 g of water. The polymerization is continued for 60 min under these conditions, with boiling of the solution. At 62° C. (atmospheric pressure), a solution of 22.5 g of SPA in 127.5 g of demineralized water and a solution of 1.5 g of bis-(4-tert-butylcyclohexyl) peroxydicarbonate in 13.5 g of acetone are then metered, simultaneously and continuously over a period of 120 min, into the boiling polymer solution. The reaction is then completed at a reaction temperature of 62° C. and, after a total reaction time of 20 h, the mixture is cooled to room temperature. During the entire time, any amounts of $O_2$ present are removed from the reaction mixture by sucking through a gentle stream of $N_2$. The polymer solution obtained is transparent.

The polymer content is 32.42% by weight. The relative viscosity, measured in absolute methanol at 25° C., is 3.363.

1.2 Preparation of a repulpable contact adhesive material.

92.54 g (30 g of polymer) of the polymer solution prepared according to 1.1 are mixed with 67.25 g of an ethoxylated liquid primary coconut fatty amine ($C_{12}$). In this plasticizing compound, the hydrogen atoms of the amino group are all substituted by ethoxy chains. The total number of ethoxy units is on average 15 per amino function (trade name Ethomeen C 25 from Akzo). A suspension of 2.5 g of polyester fibers (length 6 mm, diameter 12 μm) in 78 g of isopropanol is stirred into the mixture while stirring. Thereafter, 0.05 g of the bisglycidyl ether of bisphenol A, dissolved in 117 g of acetone, is uniformly distributed in the mixture, and a clear brushable contact adhesive solution is obtained by stirring in 39 g of water.

1.3 Production of a contact adhesive film

As described in the section on test methods (2. static shear test), the contact adhesive solution obtained according to 1.2 is painted onto the release surface of release paper treated so that it has a release effect on one side, and said solution is dried to give a 50 μm thick film.

Test results for the fresh sample (after storage for 48 h in a standard environment according to DIN 50014-23/50-1):

Repulpability: satisfactory, the paper test discs obtained show absolutely no tack or stickies.

The same result is obtained after exposing the contact adhesive film to a temperature of 120° C. for 80 min.

Static shear test: after shearing for 5000 min at a tensile force of 10 N/cm, no displacement, no breaking off and no shearing off of the splice is observed.

The same result is obtained when the contact adhesive film is exposed to a temperature of 120° C.

Adhesive force at take-off angle of 180°: 3.55 N/cm.

Tack: 0.1 N/cm.

EXAMPLE 2

2.1 Preparation of a hydrophilic skeletal polymer 225 g of acrylic acid, 202.5 g of 2-ethylhexyl acrylate, 400 g of acetone and 50 g of ethanol are weighed into a vacuum-tight polymerization apparatus having a capacity of 2 1 and corresponding to Example 1. After evacuation, flushing with $N_2$ and heating up to 62° C., a solution of 0.5 g of 2,2-azobis-(2-methylbutyronitrile) in 8 g of acetone is added, while stirring, to the reaction medium boiling at 650 hPa. The polymerization begins with slowly decreasing boiling point and increasing viscosity of the reaction mixture. After a reaction time of 50 min, a further 0.5 g of 2,2-azobis(2-methylbutyronitrile), dissolved in 150.0 g of acetone and 25.0 g of ethanol, is added at 58° C. The polymerization is continued with boiling of the reaction mixture at 60° C. and 800 hPa. After a reaction time of a further 100 min, 150.0 g of acetone and 25 g of ethanol are added as diluents, and the pressure is adjusted to atmospheric pressure. The polymerization is continued for a further 180 min with boiling at 59° C.–60° C. Thereafter, a solution of 22.5 g of SPA in 127.5 g of demineralized water and a finely divided dispersion of 4 g of bis-(4-tertbutylcyclohexyl) peroxydicarbonate in 6 g of water are simultaneously metered into the boiling reaction mixture over a period of 120 min at 60° C. The reaction is completed at 61° C., the total reaction time being 20 h. An inert atmosphere is provided in the reaction space during the polymerization, similarly to Example 1. After cooling, the polymer solution is diluted with 175 g of demineralized water and 50 g of ethanol.

The polymer content is 30.07% by weight and the relative viscosity, measured in 4.00:1.20 methanol/water at 25° C., is 2.500.

2.2 Preparation of a contact adhesive material 94.8 g (28.5 g of polymer) of the polymer solution prepared according to 2.1 are mixed with 60.4 g of the water-soluble plasticizer described in Example 1 under 1.2. A solution of 8.0 g of an adhesive resin (unesterified rosin having an acid number in the region of 170) in 66.7 g of acetone is mixed with the mixture. A suspension of 3 g of polyester fibers according to Example 1 in 51 g of isopropanol and 25 g of water is then stirred in. Prior to painting, a solution of 0.05 g of the diglycidyl compound described in Example 1, in 10 g of acetone, is distributed uniformly in the mixture.

2.3 Production of a contact adhesive film

The contact adhesive solution obtained according to 2.2 is worked up to give a contact adhesive film, as described in the section on test methods.

Test results for the fresh sample (after storage for 48 h in a standard environment according to DIN 50014-23/50-1):

Repulpability: satisfactory, the paper test discs obtained show absolutely no tack or stickies.

The same result is obtained after exposing the contact adhesive film to a temperature of 120° C. for 80 min.

Static shear test: the splice withstands 25° C. and a load of 5.0 N/cm for 100 min.

The same result is obtained when the contact adhesive film is exposed to a temperature of 120° C.

Adhesive power at take-off angle of 180°: 4.97 N/cm.

Tack: 0.56 N/cm.

We claim:

1. Repulpable contact adhesive based on a graft polymer in which 3–20% by weight of vinyl compounds having sulphonic acid salt groups are grafted onto a copolymer of (meth)acrylates and (meth)acrylic acid and which has been rendered tacky by means of water-soluble plasticizers.

2. Repulpable contact adhesive according to claim 1, characterized in that the copolymer onto which the vinyl compounds are grafted is essentially unbranched and consists of acrylic acid and alkyl acrylates having 1–12 C atoms in the alkyl chain, and minor amounts of copolymerizable monomers.

3. Repulpable contact adhesive according to claim 2, wherein the copolymerizable monomer is a (meth)acrylamide derivative or an N-vinyllactam.

4. Repulpable contact adhesive according to claim 1, characterized in that the copolymer contains 15–95% by weight of (meth)acrylic acid.

5. Repulpable contact adhesive according to claim 1, characterized in that the monomers to be grafted onto the copolymer are (meth)acrylates having sulphonic acid salt groups on the alkyl radical.

6. Repulpable contact adhesive according to claim 1, characterized in that the contact adhesive film is weakly crosslinked.

7. Repulpable contact adhesive according to claim 1, characterized in that it contains polyethylene glycols which are liquid at room temperature, polypropylene glycols, mixtures thereof or copolymers or ethoxylated or propoxylated alkylamines having alkyl radicals of $C_4$–$C_{18}$ as plasticizers.

8. Repulpable contact adhesive according to claim 1, characterized in that the amount of plasticizers in the contact adhesive film is 40–75% by weight.

9. Repulpable contact adhesive according to claim 1, characterized in that it contains 3–30% by weight of polar adhesive resins in order to increase the adhesive power.

10. Repulpable contact adhesive according to claim 1, characterized in that some or all of the carboxyl groups present have been neutralized.

11. Repulpable contact adhesive according to claim 3, wherein the copolymer onto which grafting was effected contains 15–95% by weight of (meth)acrylic acid, the vinyl compounds grafted onto the copolymer are (meth)acrylates having sulphonic acid salt groups on the alkyl radical, the contact film is weakly crosslinked, the adhesive contains 40–70% by weight of polyethylene glycols, mixtures thereof or copolymers or ethoxylated or propoxylated alkylamines having alkyl radicals of $C_4$–$C_8$ as plasticizers, the adhesive contains 3–30% by weight of polar adhesive resins in order to increase the adhesive power, and at least some of the carboxyl groups have been neutralized.

* * * * *